United States Patent [19]

Slack et al.

[11] 4,436,564

[45] Mar. 13, 1984

[54] REINFORCEMENT PRODUCT FOR USE IN CEMENT BOARDS AND A METHOD OF MANUFACTURING SAID PRODUCT AND BOARDS

[75] Inventors: Ian D. Slack, Bradford; David G. Ellis, Leeds; Colin Firth, Bradford, all of England

[73] Assignee: Plasticisers Limited, Yorkshire, England

[21] Appl. No.: 289,377

[22] Filed: Aug. 3, 1981

[30] Foreign Application Priority Data

Aug. 2, 1980 [GB] United Kingdom ................. 8025300

[51] Int. Cl.³ .......................... B32B 3/18; B32B 5/10; B32B 5/12; B32B 13/02

[52] U.S. Cl. .................................. 156/42; 19/106 R; 19/299; 19/302; 264/147; 264/DIG. 47; 428/113; 428/255; 428/286; 428/293; 428/294; 428/302; 428/523; 428/703

[58] Field of Search .................. 156/42; 428/286, 703, 428/113, 293, 294, 302, 523, 255; 19/106 R, 299, 302; 264/DIG. 47, 147

[56] References Cited

U.S. PATENT DOCUMENTS

| | | | |
|---|---|---|---|
| 1,571,579 | 2/1926 | Duryea | 428/113 |
| 2,315,851 | 4/1943 | Goldman | 428/113 |
| 3,490,983 | 1/1970 | Lee | 428/113 |
| 3,682,755 | 8/1972 | Lee | 428/302 |
| 3,821,062 | 6/1974 | Henderson | 428/113 |
| 4,214,027 | 7/1980 | Knauf et al. | 428/113 |
| 4,216,856 | 8/1980 | Moring et al. | 428/113 |
| 4,242,407 | 12/1980 | Bijen | 156/42 |
| 4,267,136 | 5/1981 | Bijen | 428/255 |
| 4,288,263 | 9/1981 | Delcoigne et al. | 428/703 |
| 4,297,409 | 10/1981 | Hannaht | 264/DIG. 47 |
| 4,344,804 | 8/1982 | Bijen et al. | 428/703 |
| 4,344,910 | 8/1982 | Bijen | 428/703 |
| 4,361,616 | 11/1982 | Bomers | 428/703 |
| 4,373,981 | 2/1983 | Bomers et al. | 428/703 |

*Primary Examiner*—James C. Cannon

*Attorney, Agent, or Firm*—Fred Philpitt

[57] ABSTRACT

The present invention discloses a reinforcement product for use in cement boards and a method of manufacturing said product and of manufacturing cement boards using this product.

The reinforcement product of the present invention comprises cross-layered webs of plastic fibres with a preponderance of fibres laid in the trans-axial direction, and continuous filaments or fibrillated tapes located between the layers to impart a high degree of strength in the axial direction. The cross-layered web and the filaments or tapes are compacted to form a reinforcement product which can be rolled up and handled for further processing on cement board forming machines. The webs of plastic fibre are formed by monoaxially orientating on extruded sheet of plastics material in axial direction, then fibrillating the sheet to form a cohesive fibre mass which is cut into lengths and carded to break up the film into a coarse fibrous mass which when stripped from the carding machine forms said plastic fibre web. This reinforcement product is made, according to the present invention in sequential steps and is either impregnated with cement or sandwiched with cement layers to form the required cement board.

14 Claims, 1 Drawing Figure

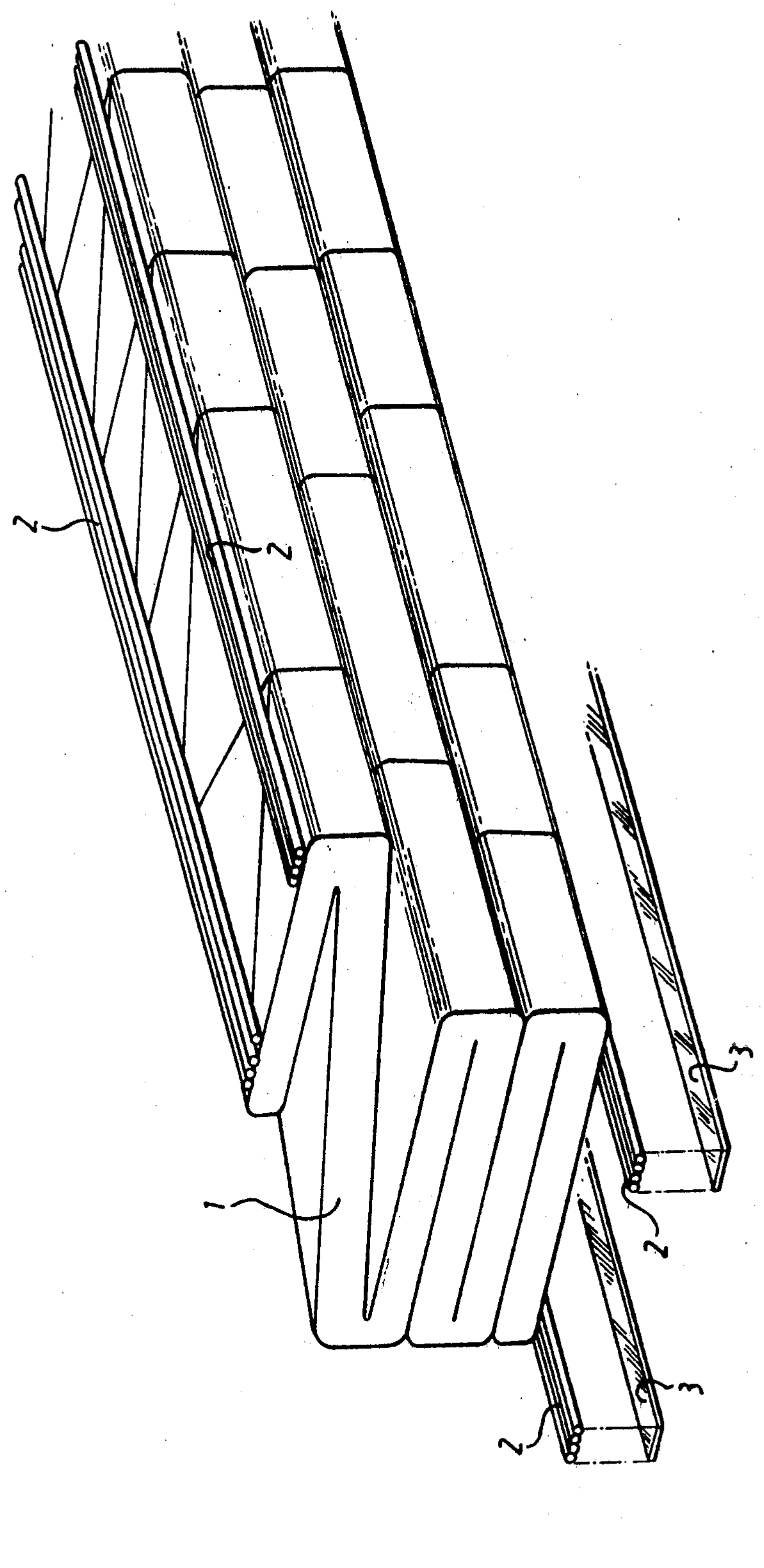
2
2
1
3
2
3
2

REINFORCEMENT PRODUCT FOR USE IN CEMENT BOARDS AND A METHOD OF MANUFACTURING SAID PRODUCT AND BOARDS

The present invention relates to a reinforcement product for use in cement boarding which is to be used as a constructional material, a method of manufacturing said reinforcement product, and a product and process of manufacturing a cement board incorporating said reinforcement product.

Hitherto asbestos fibre has been exclusively used for such a reinforcement product but in recent years a great deal of attention has been given to using plastic materials for this purpose. There are however several considerations that have to be borne in mind when trying to produce a composite material of two materials i.e. cement and reinforcement, which are not compatible in physical properties, to ensure that a satisfactory bond is created between the reinforcing material and the mass of the product, as compared with the known cement and asbestos which are two mineral substances with a high affinity to one another.

Chopped plastic fibres can be used to replace asbestos fibres in the existing cement board manufacturing process. For example the Hatschek process. However, in the case of, for example, polyolefin fibres another fibre must be used as a carrier fibre such as cellulose pulp fibres or indeed asbestos fibres. There is also a limit to the quantity and length of such polyolefin fibres that can be easily incorporated by mixing in the cement slurry before the board formation process. Longer fibres are preferred to increase the fibre cement bond but shorter fibres give a more homogeneous dispersion. For this latter reason fibres down to ≦6 mm are preferred.

Some development work in this area has been directed towards producing a plastic based fibre with a high modulus. Other work has been directed to forming a network structure from fibrillated plastic film and although methods so far evaluated have proved that an acceptable product can be produced, no method has so far produced a commercially viable product. The use of such network structures ensures good mechanical keying between cement and fibres. However the commercial process for producing such networks is very sophisticated and must be capable of producing a multilayer structure consisting of many layers of high quality fibrillated highly drawn films, which must then be introduced into the cement matrix before curing of the matrix takes place.

The aim of the present invention is to produce a commercially viable reinforcement product suitable for use in cement boarding.

According to the present invention there is provided a reinforcement product for use in cement boards, comprising cross layered webs of plastic fibre with a preponderance of fibres laid in a trans-axial direction, and continuous filaments or fibrillated tapes located between the layers to impart a high degree of strength in the linear direction, the cross-laid web and the filaments or tapes being compacted together to form a reinforcement product which can be rolled up and handled for further processing on cement board forming machines, the webs of plastic being formed from a sheet or film of plastics material which has been monoaxially orientated in the linear direction, fibrillated to form a cohesive fibre mass, cut into desired lengths, carded to break up the fibrillated film into a coarse fibre mass, and stripped from the carding machine to form a continuous web of fibres.

The web produced by the present invention, may be compressed at this stage to create the desired thickness corresponding with the chosen cement board thickness. The compressed web may be also needled at this stage so as to interlock the layers of web and the layers of web and continuous filaments and/or fibrillated tapes. In a modification the needling process is envisaged as taking place after the web has been presented to the cement paste in the cement board making process, in which case the needling action is to interlock the fibres and to assist the penetration of cement paste into the web structure so to give an homogeneous array of fibres in the cement paste.

This invention permits the use of very long chopped fibres in the formation of web, for example 75-150 mm, lengths which are not possible on the Hatschek route of direct mixing.

Also various different fibres with different properties can be blended before the web information process to offer a blend of reinforcement properties in the cement board.

Also the web formation process makes possible the use of fibres with a high degree of fibrillation and with a high propensity to fibrillate. Such fibres are desirable in the reinforcement of cement where increase of specific fibre surface area is important in improving fibre with cement bond.

Also the web formation process permits the use of blends of fibres with improved chemical bond with cement which are difficult to process on more sophisticated or more critical fibre handling processes. Additional surface treatments can also be sprayed onto the fibres either during or after the web formation process.

According to a further aspect of the present invention there is provided a method of manufacturing a reinforcement product for use in cement boards, comprising the steps of extruding a sheet or film from a plastics material, monoaxially orientating the said sheet in the linear direction, fibrillating the orientated sheet to form a cohesive fibre mass, cutting the fibrillated film into desired lengths, carding the cut lengths of fibrillated film to break up the fibrillated film into a coarse fibrous mass, stripping the fibrous mass from the carding machine to form a continuous web or bat of fibres, cross-layering the web of fibres to ensure an even thickness with a preponderance of the fibres being laid in a trans-axial direction, and simultaneously introducing continuous filaments or fibrillated tapes between the layers to impart a high degree of strength in the linear direction, and compacting the cross-laid web of fibres together with the said continuous filaments or fibrillated tapes to give cohesion between the fibres in the web and produce a web which can be rolled up and handled for further processing on cement board forming machines.

Preferably the plastics material forming the sheet or film is polypropylene to which compounds e.g. high density polyethylene (10% by weight), have been added to aid the later orientation of the film and additives e.g. wetting agents, have been added to enhance bonding of the polypropylene to cement. Further, the said sheet or film is monoaxially orientated in the linear or axial direction at least six times and preferably in excess of eighteen times.

Fibrillation of the orientated plastics sheet to form a cohesive fibrous mass is preferably effected by passing the sheet under tension over a rotating roller, the surface of which has projecting steel pins, the rotation of the pinned roller being such that a difference of speed exists between the peripheral speed of the roller and the linear speed of the sheet.

Preferably the fibrillated sheet is cut into lengths between 25 mm and 150 mm in length and the subsequent carding is preferably completed on a textile carding machine.

The compacted reinforcement product of the present invention, can be supplied in roll form to a cement board making machine, where a cement slurry is used to impregnate the web. Excess moisture is then removed from the web by either calendering or alternatively by a vacuum process and it is then allowed to set.

In a modified method of applying the reinforcement product of the present invention, a number of fine webs are produced and in the cement board making machine, a sandwich effect is formed by having a layer of reinforcement web followed by a layer of cement slurry and building up a composite sandwich. The complete sandwich of material can then be vibrated or tamped down to ensure a satisfactory integration of the cement and reinforcement material.

The main advantages of using a reinforcement product according to the present invention, for reinforcing cement boards are as follows:

(a) The fibres produced from highly orientated film by the fibrillation process followed by carding, produces fibre with an irregular surface which readily forms a mechanical bond with the granular structure of the cement. This can be further enhanced by the use of bonding agents which can be added to the plastic e.g. polypropylene, at the time of extrusion or can be applied on to the finished fibre before or after the carding operation.

(b) The manufacture of fibrillated film is a well-known process and variations in film thickness do not have any appreciable effect on the quality of the product, and indeed such variations in fibre cross-section can enhance the bond between fibre and cement matrix.

(c) The texture of the reinforcing material can be readily varied so that cement board with a heavy cross-section can have relatively coarse fibres and cement board with a very small cross-section, can be supplied with a very fine fibre structure. This can be done merely by altering the film thickness, the degree of fibrillation and carding, the cross-laying ratio and compaction, as for example, by varying the degree of fibrillation and cut length of the orientated film. Thus a reinforcement product can be produced that is highly suitable for use in moulded products which enables a pattern to be formed on the surface of the cement board.

The present invention thus provides a commercially viable reinforcement product especially suitable for the reinforcement of cement boards to be used as a constructional material.

The present invention will now be described by way of the following examples. The present invention is, however, in no way limited to the following examples:

EXAMPLE 1

Fibrillated polypropylene tapes were manufactured by the extrusion of 1.5 MFI homopolymer. The undrawn film was stretched with a draw ratio of 20:1 in hot air (at 190° C.) to manufacture a film of 35 micron thickness. The film was fibrillated in line by passing over a pin fibrillator roller with 1.57 pins/mm width and consecutive rows set with a staggered offset of 50 microns. The fibrillator roller was rotated with a surface speed of approximately twice the film speed, and then was finely adjusted to give slit lengths of 10 mm length on average.

The tapes were created by slitting the film before stretching. The stretched tapes had a width of 1.4 mm. The fibrillated tapes were relaxed in hot air (5% at 120° C.) before cutting in line (a two stage operation is possible if tapes are firstly collected in a roller or in a can-coiler) to 75 mm length.

The chopped fibrillated tapes were fed into a worsted carding machine and a carded web of 15 g/m$^2$ was conveyed from the card at 18.8 m/min onto a cross-lapping machine. The cross-laid web was received at right angles from the slow conveyor at 1.3 m/min at 217 g/m$^2$ with the majority of fibres preferentially laid in the trans-axial direction. The resultant web was then pressed and needled to give a compacted thickness of $\leqq$3 mm.

EXAMPLE 2

Fibrillated polypropylene tapes were manufactured by the extrusion of 1.5 MFI homopolymer (with 1.0% ordinary Portland cement additive). The undrawn film was stretched with a draw ratio of 20:1 in hot air (at 190° C.) to manufacture a film of 35 micron thickness. The film was fibrillated in line by passing over a pin fibrillator roller with 1.57 pins/mm width and consecutive rows set with a staggered offset of 50 microns. The fibrillator roller was rotated with a surface speed of approximately twice the film speed, and then was finely adjusted to give slit lengths of 10 mm length on average.

The tapes were created by slitting the film before stretching. The stretched tapes had a width of 1.4 mm. The fibrillated tapes were relaxed in hot air (5% at 120° C.) before cutting in line (a two stage operation is possible if tapes are firstly collected in a roll or in a can-coiler) to 75 mm length.

The chopped fibrillated tapes were fed into a worsted carding machine and a carded web of 15 g/m$^2$ was conveyed from the card at 18.8 m/min onto a cross-lapping machine. The cross-laid web was received at right angles from the slow conveyor at 1.3 m/min at 217 g/m$^2$ with the majority of fibres preferentially laid in the trans-axial direction. The resultant web was then pressed and needled to give a compacted thickness of $\leqq$3 mm.

EXAMPLE 3

Continuous filaments and fibrillated yarns were unwound onto the top of the cross-lapped web from example (1) at 300 denier/filament or yarn at a spacing of 100/m width (i.e. 1 cm apart) of fibre so to increase the average tensile strength in the machine direction by approximately +15%.

The filaments were interconnected to the web in the subsequent needling operation.

EXAMPLE 4

A cement board was made by passing the web of example (1) through a bath of cement slurry and excess slurry was removed by passing the impregnated web onto a porous fabric conveyor consisting of doctor blades, compression rollers and vacuum box (beneath moving fabric).

The board was adjusted to 3 mm thickness to give a polypropylene concentration of approximately 7% by volume. The cement paste was applied at 0.5 w/c ratio incorporating a recipe of 20% fine sand (≦0.5 mm size particles) by weight of dry portland cement, with some superplasticiser to assist flow of the mortar paste in processing.

EXAMPLE 5

As in Example 4 the method was followed with fabric produced by Method 3. Two webs were employed to produce a sandwich of two impregnated webs (3 mm each) which were brought together before compressing with the continuous filaments on the outside of the sheet (to give most reinforcement in tension in longitudinal direction in flexure). Compaction of cement and webs was done to achieve boards of 6 mm thickness.

EXAMPLE 6

As in Example 4 except the fibrillated polypropylene tapes were coated with a wetting agent during manufacture to assist in the melting out of the web by the cement web in the cement board manufacture.

EXAMPLE 7

As in Example 6, but in a subsequent process after impregnation of the web by cement slurry, the "soaking" web was passed through a needling machine which agitated the cement and web and further interloced the fibres in the web and cement slurry.

EXAMPLE 8

As in Example 7 except the web was impregnated with the cement slurry by pouring cement from a die onto the web moving on a semi porous conveyor below which a vacuum box in contact with the fabric was applied before the needling operation. In a further modification the web formation process consisted of a minimal of light needling, the major needling took place when web had been impregnated with cement slurry.

The present invention will now be still further described, by way of example, with reference to the accompanying drawing, in which a perspective, partially cutaway view, of one embodiment of a reinforcement product constructed according to the present invention, is shown.

The embodiment of the present invention shown in the accompanying drawing comprises cross layered webs 1 of plastic fibre with a preponderance of fibres laid in a trans-axial direction with regard to the completed reinforcement product, the webs being formed as random fibrillated fibre fleeces. Longitudinally extending continuous filaments 2 are located between adjacent layers of the web 1 to add strength to the reinforcement product. Alternatively continuous fibrillated tapes can replace the continuous filaments 2.

We claim:

1. A reinforcement product for use in cement boards, comprising cross layered webs of plastic fibre with a preponderance of fibres laid in a trans-axial direction, and continuous filaments or fibrillated tapes located between the layers to impart a high degree of strength in the linear direction, the cross-laid web and the filaments or tapes being compacted together to form a reinforcement product which can be rolled up and handled for further processing on cement board forming machines, the webs of plastic being formed from a sheet or film of plastics material which has been monoaxially orientated in the linear direction, fibrillated to form a cohesive fibre mass, cut into desired lengths, carded to break up the film into a coarse fibre mass, and stripped from the carding machine to form a continuous web of fibres.

2. A reinforcement product for use in cement boards, comprising cross layered webs of plastic fibre with a preponderance of fibres laid in a trans-axial direction, and continuous filaments or fibrillated tapes located between the layers to impart a high degree of strength in the linear direction, the cross-laid web and the filaments or tapes being compacted together to form a reinforcement product which can be rolled up and handled for further processing on cement board forming machines, the webs of plastic being formed from a sheet or film of polypropylene which has been monoaxially orientated in the linear direction, fibrillated to form a cohesive fibre mass, cut into desired lengths, carded to break up the film into a coarse fibre mass, and stripped from the carding machine to form a continuous web of fibres, and a further compound has been added to aid the orientation of the film and a wetting agent is added to enhance bonding of the polypropylene to cement.

3. A reinforcement product according to claim 2 wherein said added compound is high density polyethylene.

4. A method of manufacturing a reinforcement product for use in cement boards, a comprising the steps of extruding a sheet or film from a plastics material, monoaxially orientating the said sheet in the linear direction fibrillating the orientated sheet to form a cohesive fibre mass, cutting the fibrillated film into desired lengths, carding the cut lengths of fibrillated film on a carding machine, to break up the fibrillated film into a coarse fibrous mass, and stripping the fibrous mass from the carding machine to form a continuous coarse fibrous web, cross layering the web of fibres to ensure an even thickness with a preponderance of the fibres being laid in a transaxial direction, introducing continuous filaments or fibrillated tapes between the layers to impart a high degree of strength in the linear direction, and compacting the cross-laid web of fibres together with said continuous filaments or fibrillated tapes, to give cohesion between the fibres in the web and produce a web which can be rolled up and handled for further processing on cement board forming machines.

5. A method of manufacturing a reinforcement product for use in cement boards, comprising the steps of extruding a sheet or film from a plastics material, monoaxially orientating the said sheet in the linear direction, fibrillating the orientated sheet to form a cohesive fibre mass, cutting the fibrillated film into desired lengths, carding the cut lengths of fibrillated film on a carding machine to break up the fibrillated film into a coarse fibrous mass, and stripping the fibrous mass from the carding machine to form a continuous coarse fibrous web, cross-layering the web of fibres to ensure an even thickness with a preponderance of the fibers being laid in a transaxial direction, introducing continuous filaments of fibrillated tapes between the layers to impart a high degree of strength in the linear direction, and compacting the cross-laid web of fibres together with said continuous filaments of fibrillated tapes to give cohesion between the fibres in the web and produce a web which can be rolled up and handled for further processing on cement board forming machines, said plastics material being polypropylene and 10% by weight of added polyethylene to assist in the orientation of the film.

6. A method according to claim 5 wherein a wetting agent is added to the plastics material to enhance bonding to cement.

7. A method according to claim 5 wherein the sheet or film of plastics material is monoaxially orientated in the linear or axial direction at least six times.

8. A method according to claim 5 wherein the sheet or film of plastics material is monaxially orientated in excess of eighteen times.

9. A method according to claim 5 wherein fibrillation of the orientated plastics sheet to form a cohesive fibrous mass is effected by passing the sheet under tension over a rotating roller, the surface of which has projecting pins, the rotation of the pinned roller being such that a difference of speed exists between the peripheral speed of the roller and the linear speed of the sheet.

10. A method according to claim 5 wherein the fibrillated sheet is cut into lengths between 25 mm and 150 mm in length.

11. A method of manufacturing a cement board using a reinforcement product constructed by the method according to claim 5 wherein a cement slurry is impregnated into the reinforcement product, excess moisture is subsequently removed, and the board is then allowed to set.

12. A method according to claim 11 wherein excess moisture is removed by calendering.

13. A method according to claim 11 wherein excess moisture is removed by a vacuum process.

14. A method of manufacturing a cement board according to claim 11 wherein a sandwich effect is utilized by placing a layer of cement slurry, followed by further reinforcement product layer and alternate cement slurry layers to produce a composite sandwich, the complete sandwich of material being then vibrated or tamped down to ensure a satisfactory integration of the cement and reinforcement product, the whole being subsequently allowed to set.

* * * * *